United States Patent [19]
Pratt

[11] Patent Number: 5,390,413
[45] Date of Patent: Feb. 21, 1995

[54] BLADED DISC ASSEMBLY METHOD BY HIP DIFFUSION BONDING

[75] Inventor: Anthony L. Pratt, Bristol, England
[73] Assignee: Rolls-Royce plc, London, England
[21] Appl. No.: 135,440
[22] Filed: Oct. 13, 1993

[30] Foreign Application Priority Data
Oct. 16, 1992 [GB] United Kingdom ............... 9221796

[51] Int. Cl.⁶ ............................................. B23P 15/00
[52] U.S. Cl. .............................. 29/889.21; 29/889.2
[58] Field of Search .............. 29/889.2, 889.21, 889.22, 29/889, 428

[56] References Cited

U.S. PATENT DOCUMENTS

| | | | |
|---|---|---|---|
| 1,470,508 | 10/1923 | Steenstrup | 29/889.22 |
| 2,450,493 | 10/1948 | Strub | 29/889.21 |
| 2,778,095 | 1/1957 | Schörner | 29/889.21 |
| 3,590,454 | 7/1971 | Brass | 29/889.21 |
| 4,812,107 | 3/1989 | Barcella et al. | 416/191 |
| 5,031,288 | 7/1991 | Sadler | 29/889.22 |
| 5,197,190 | 3/1993 | Coolidge | 29/889.21 |

FOREIGN PATENT DOCUMENTS

| | | | |
|---|---|---|---|
| 2109274 | 6/1983 | United Kingdom | 29/889.21 |
| 0258832 | 2/1979 | U.S.S.R. | 29/889.21 |

*Primary Examiner*—Irene Cuda
*Attorney, Agent, or Firm*—Oliff & Berridge

[57] ABSTRACT

A method of making a bladed disc assembly, of a kind used, for example, in the turbine or compressor sections of a gas turbine engine, includes forming a peripheral groove in the rim of the disc, positioning a plurality of bladed segments around the disc, each segment preferably including two or more blades extending radially from a root portion, each segment having its root portion located in the groove, securing the root portions in the groove by means of electron beam welding to form circumferential seam welds at either side of the root portions and axial seam welds between the root portions of adjacent segments thereby forming a vacuum seal, and diffusion bonding the root portions and the rim of the disc by means of isostatic hot gas pressure bonding.

6 Claims, 3 Drawing Sheets

BLADED DISC ASSEMBLY METHOD BY HIP DIFFUSION BONDING

BACKGROUND OF THE INVENTION

1. Field of the Invention

This invention relates to a method of making a bladed disc assembly of the kind used in the compressor turbine sections of a gas turbine engine.

2. Description of Related Art

An axial flow turbine of a typical gas turbine engine includes one or more bladed disc assemblies each comprising a central disc member mounted for rotation about the longitudinal axis of the engine. From the periphery of the disc of such an assembly there extends radially outwards a plurality of blades each of an aerofoil cross-section and forming a circumferential series around that periphery. A turbine may comprise several such bladed disc assemblies axially spaced along the axis of the engine, the axial spacing enabling a circumferential series of fixed guide vanes to be interposed between the blades of adjacent bladed disc assemblies each of the guide vanes being directed radially inwards from the casing which encloses the turbine.

The blades may be attached to the disc by means of fir tree root fittings on the blades, the root fittings being pressed into slots broached in the periphery of the disc and secured by peening on each side.

The blades of a bladed disc assembly may be made singly or in groups, and several methods are available for connecting blades to a disc.

In a typical example a single bladder, which may be cast from a nickel base alloy, is attached to a disc by means of a fir tree root on the blade, which root is pressed into a slot broached in the periphery of the disc. This form of attachment requires very accurate machining to ensure that the loading upon the blades is shared by all the serrations of the fir tree configuration.

In another example, groups of blades, eg three blades, are cast as a single unit and the appropriate number of such groups is assembled around the periphery of a disc before they are secured in place by fusion welding.

In yet another example a dual alloy disc is provided with a ring of cast turbine blades bonded to the discs.

Diffusion bonding which is essentially a solid-state bonding process, refers to the metallurgical joining of metal surfaces by the application of heat and pressure to cause intermingling of atoms at the joint interface. It differs from fusion welding in that fusion welding is dependent upon melting of the metals at the joint interface whereas, in most instances, diffusion bonding is accomplished entirely in the solid-state at a temperature well below the melting point of the metal.

Three major conditions require careful control for successful diffusion bonding, these being pressure, temperature and time (at a given temperature and pressure). The temperature accelerates the commingling of atoms at the joint interface and provides metal softening which aids surface deformation and more intimate contact. The time employed is controlled to be at a minimum, the time allowed being that sufficient to assume that surfaces are in intimate contact and some atomic movement has occurred across the interface. Generally, diffusion bonding is carried out in a vacuum or in an oxygen-free inert gas, eg argon, environment. It is essential to provide smooth clean conforming surfaces at the bond face when diffusion bonding, and in some cases, an intermediate layer of soft material such as molybdenum may be employed. The cleaning may for instance be provided by chemical cleaning methods.

Several techniques may be used in diffusion bonding, one such being hot isostatic pressure bonding where uniform application of pressure is necessary over all the surfaces of the joint. The level of pressure required is high. For example, diffusion bonding may be accomplished in an autoclave and the joint surfaces subjected to 15,000 psi (1054 kg./sq. cm.) of inert gas at over 500° C., whilst in another example satisfactory bonding may require a pressure of 60,000 psi (4218 kg/sq. cm.) at 2000° C., in which case the pressurising media may be an hydraulic fluid in combination with a material such as silica sand.

SUMMARY OF THE INVENTION

An object of the present invention is to provide an improved method of securing the blades to the disc of a bladed disc assembly by means of a non-fusion process and eliminating any cast structure at the joint.

According to one aspect of the invention there is provided a method of making a bladed disc assembly which assembly comprises a disc rotatable about an axis and having axially opposed end faces and a peripheral surface extending between said end surfaces, said peripheral surface being provided with a circumferentially extending groove and a plurality of blade segments each said blade segment being provided with a blade portion and a root portion, each said root portion being located in said groove thereby to provide a circumferential series of blades extending radially from said peripheral surface, said method comprising the steps of in a manufacturing step: forming a disc having axially opposed end faces and a peripheral surface extending between said end faces, forming in said peripheral surface a circumferentially extending groove, and forming a plurality of bladed segments, each bladed segment having a blade portion and a root portion; in an assembly step: assembling the bladed segments directly with the disc by locating the root portions in the circumferentially extending groove and positioning the blade segments one adjacent to another; performing a vacuum electron beam welding step; and performing a diffusion bonding step of applying heat and pressure to the end surfaces of the disc to bond together the unexposed surfaces of the root portions and of the disc and the circumferentially extending groove therein.

Each blade segment may include at least two blades of aerofoil cross-section.

Preferably said root portions are secured together and to said peripheral surface by electron beam welding which may be carried out under a vacuum so as to provide a vacuum seal between said root portions and said peripheral surface.

BRIEF DESCRIPTION OF THE DRAWINGS

A specific embodiment of the invention will now be described by way of example only with reference to the accompanying diagrammatic non-scale drawings in which.

DETAILED EXPLANATION OF THE PREFERRED EMBODIMENT

Figure 1:
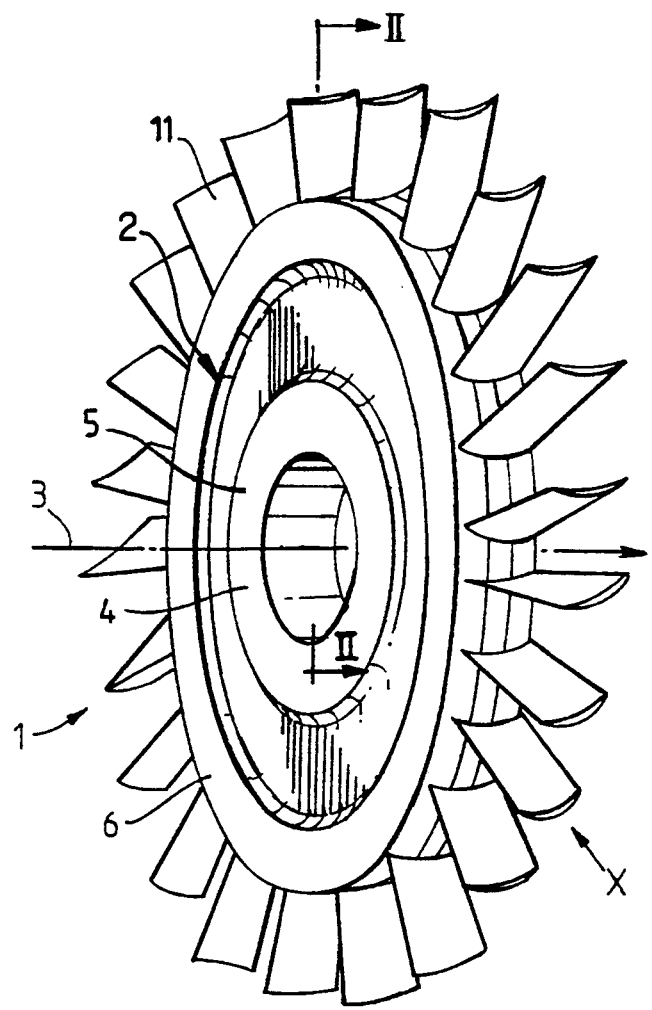
FIG. 1 shows in perspective a bladed disc assembly.

A bladed disc assembly 1 for use in a gas turbine engine is shown in FIG. 1. It includes a disc 2 of nickel alloy rotatable about an axis 3 and comprising a central bearing member 4 from which extends a web 5 supporting an outer rim 6 having axially opposed end surfaces 7,8 and an outer peripheral surface 9. Blades 11 of aerofoil cross-section extend radially outwards from the outer peripheral surface 9 of the rim 6.

Figure 2:
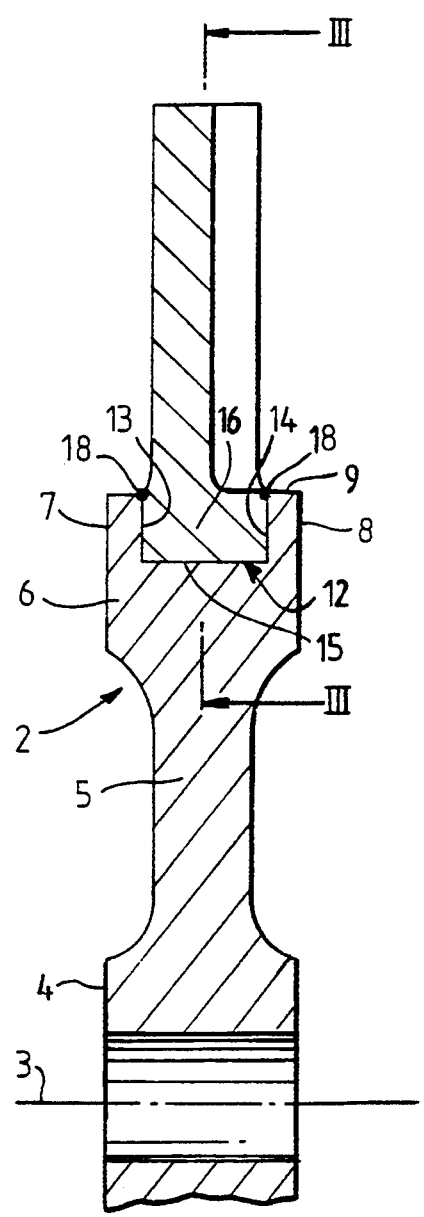
FIG. 2 is a cross-sectional view along the line II—II of the bladed disc assembly shown in FIG. 1, before a diffusion bonding operation.
Figure 3:
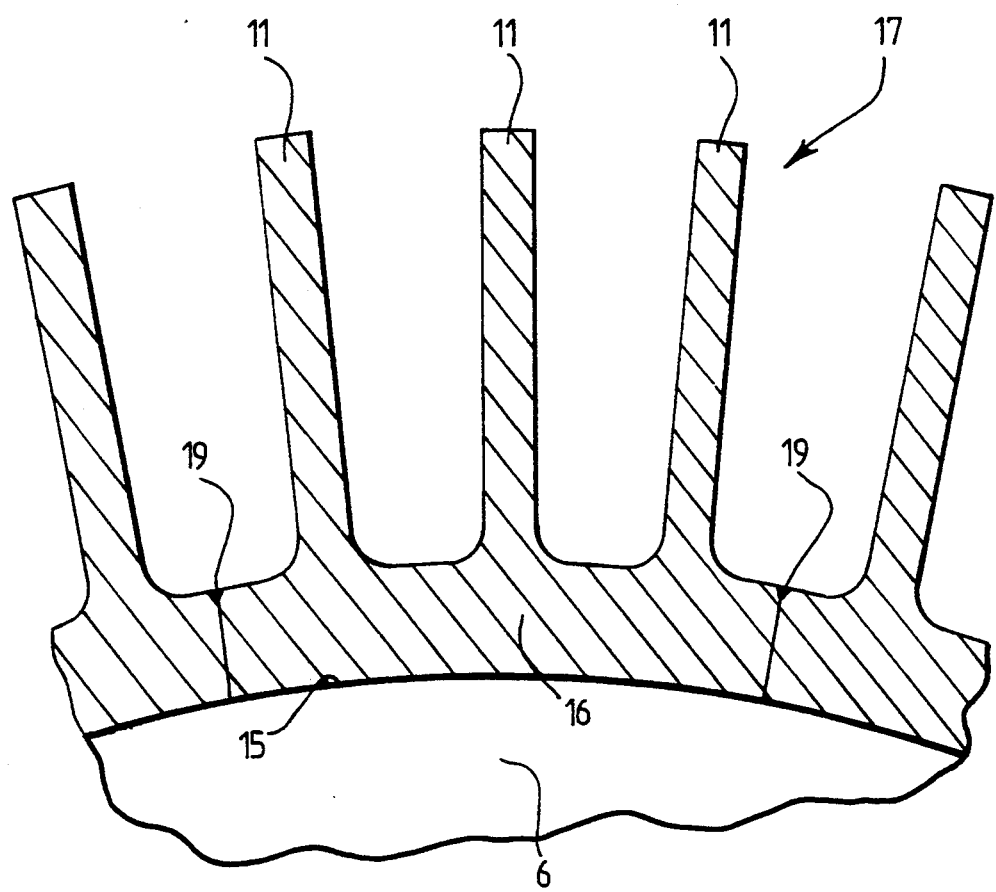
FIG. 3 is a cross-sectional view along the line III—III of the bladed disc assembly shown in FIG. 2.
Figure 4:
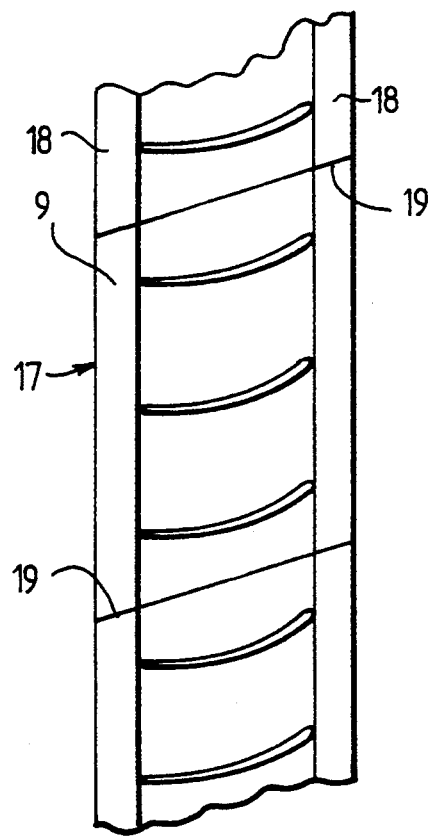
FIG. 4 is a view of the bladed disc assembly shown in FIG. 1 looking radially inwards along the line "X"
Figure 5:
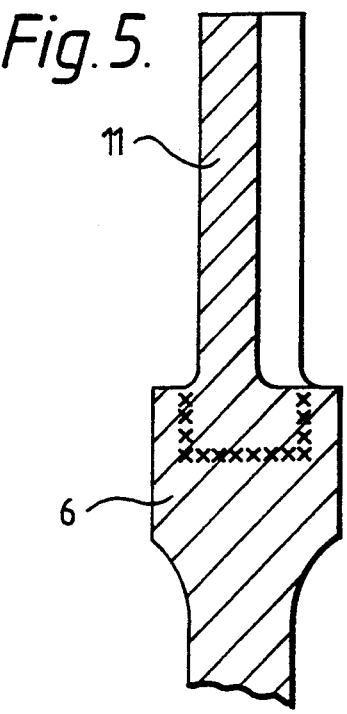
FIG. 5 is a cross-sectional view along the line II—II of the bladed disc assembly shown in FIG. 1 after the diffusion bonding operation.

As can be seen in FIGS. 2 and 23 the outer surface 9 of the rim 6 is grooved at 12, the groove extending peripherally around the rim and comprising side walls 13,14 and a bottom surface 15. Root portions 16 associated with the blades 11 together form blade segments 17 and these segments are integrally formed as by casting from a nickel base alloy. The blade segment 17 shown in the drawings has three blades 11 extending from a single root portion 16 but there may be more or fewer blades in a segment as is found to be the most suitable in the circumstances.

A bladed disc assembly is made by first assembling the appropriate number of blade segments 17 around the periphery of a disc 2. The seams 18 between blade roots and the edges of the groove 12 are then welded by an electron beam welding operation along a circumferential path on both sides of the root portions 16. The seams 19 extending axially between adjacent segments are then welded by an electron beam welding operation in the presence of a vacuum so as to exclude all air from between the surfaces 13,14,15 of the groove 12 and the root portions 16 of the blade segments. Finally, the annular areas presented by the axially opposed end surfaces 7,8 of the rim 6 of the disc are subjected to an isostatic hot gas pressing operation in an autoclave so as to metallurgically join the metal surfaces 13,14,15,16. The operation comprises applying pressure in an axial direction against the end surfaces 7,8 of the rim 6 whilst maintaining an elevated temperature for a predetermined time.

In an example, in order to diffusion bond titanium blade segments to a titanium base alloy disc a pressure of 9.8 megapascals (1421 psi or 100 kg/sq. cm.) is applied at a temperature of 800° C. for ten minutes in order to achieve a satisfactory metallurgical bond. At such pressure and temperature the material of the blade root portion and the disc rim in the area of the joint is brought to a condition where the atoms at the joint interface are caused to intermingle and thus form a metallurgical joint.

By seam welding the joints by means of electron beam welding and providing an internal vacuum as mentioned above, the requirement for carrying out the later diffusion bonding operation in a vacuum chamber is avoided.

What is claimed is:

1. A method of making a bladed disc assembly comprising the steps of:
   in a manufacturing step:
      forming a disc having axially opposed end faces and a peripheral surface extending between said end surfaces,
      forming in said peripheral surface a circumferentially extending groove, and
      forming a plurality of bladed segments, each said bladed segment having a blade portion and a root portion;
   in an assembly step:
      assembling said bladed segments directly with the disc by locating said root portions in said circumferentially extending groove and positioning the bladed segments one adjacent to another;
   in a vacuum electron beam welding step:
      enclosing said bladed disc assembly in a vacuum chamber and electron beam welding the exposed surface points to secure each of said root portions to adjacent root portions and to said peripheral surface of the disc and thereby provide a vacuum seal between said root portions and said peripheral surface; and
   in a diffusion bonding step:
      applying heat and pressure to said end surfaces of the disc to bond together the unexposed surfaces of said root portions and of said disc and said circumferentially extending groove therein.

2. The method as claimed in claim 1 wherein each said bladed segment includes at least two blades of aerofoil cross-section.

3. The method as claimed in claim 1, wherein during said step of applying heat and pressure, the pressure is applied axially to said end surfaces.

4. The method as claimed in claim 1, wherein said diffusion bonding step is carried out in a vacuum.

5. The method as claimed in claim 1, wherein said diffusion bonding step comprises an isostatic hot gas pressure bonding step.

6. The method as claimed in claim 5, wherein said isostatic hot gas pressure bonding is carried out in an autoclave.

* * * * *